United States Patent [19]

Ishikawa

[11] 4,394,764
[45] Jul. 19, 1983

[54] LASER PROCESSING APPARATUS

[75] Inventor: Ken Ishikawa, Yokohama, Japan

[73] Assignee: Tokyo Shibaura Denki Kabushiki Kaisha, Kawasaki, Japan

[21] Appl. No.: 294,816

[22] Filed: Aug. 20, 1981

[30] Foreign Application Priority Data

Aug. 28, 1980 [JP] Japan ............................. 55-118738

[51] Int. Cl.³ ............................................. H01S 3/00
[52] U.S. Cl. ....................................... 372/38; 372/29; 372/26
[58] Field of Search ........................... 372/38, 26, 29; 307/285

[56] References Cited

U.S. PATENT DOCUMENTS 3,749,976 7/1973 Colyn .................................... 372/38
4,345,330 8/1982 Howie et al. ......................... 372/29

Primary Examiner—William L. Sikes
Assistant Examiner—Léon Scott, Jr.
Attorney, Agent, or Firm—Oblon, Fisher, Spivak, McClelland & Maier

[57] ABSTRACT

Disclosed is a laser processing apparatus, which includes a falling waveform control circuit for controlling the falling of discharge current waveform. A direct current power supply circuit is connected to a main discharge circuit and the falling waveform control circuit for supplying discharge current to these circuits. The main control circuit causes the discharge of the main discharge circuit and falling waveform control circuit successively. The discharge of the main discharge circuit is provided so that it is stopped when the discharge of the falling waveform control circuit is started. The discharge of the falling waveform control circuit is stopped by a discharge current stopping circuit. The main discharge circuit and falling waveform control circuit are connected to a laser beam oscillating section. The laser beam oscillating section irradiates the workpiece with laser beam according to the main discharge current and discharge current having controlled falling waveform supplied from both the aforementioned circuits.

8 Claims, 8 Drawing Figures

LASER PROCESSING APPARATUS

BACKGROUND OF THE INVENTION

This invention relates to a laser processing apparatus and, more particularly, to a laser processing apparatus with which high quality and efficient welding of metals can be obtained.

In the process of welding metals by irradiation of a pulse laser beam, the waveform of the pulse laser beam has great influence upon the mechanical strength of the weld and the finish shape of the weld surface. Thus, for obtaining better welding, it is very important to form a waveform that is suited to the welding.

With the prior art laser processing apparatus, however, it has been in practice to generate a rectangular waveform laser pulse output through optical pumping of a laser rod with rectangular waveform pumping light from a flash lamp which is driven by a pulse power supply with an on-off control element such as switching thyristor. In this process, molten metal generated by irradiation of above-mentioned rectangular waveform laser output is cooled down suddenly by a rapid stop of laser power irradiation while it is still unstable within the weld 10. Therefore, as shown in FIG. 1 blow holes 12 are liable to be created within the weldment. Also, the superficial portion of the weld is partly spattered to result in the formation of extreme irregularities. These lead to the reduction of the mechanical strength or deterioration of the finish of the weld.

Also, there is an apparatus which does welding by the slowing falling laser pulse output power which is emitted from a rod pumped by a flash lamp driven by a charging and discharging capacitor. With this type of apparatus, the workpiece metals are cooled after they are sufficiently stabilized, so that it is possible to obtain high quality welding. In this apparatus, the capacitor is completely discharged until it has no charge before it is charged again for the next discharging operation. Therefore, it has been difficult to repeatedly generate pulses at a high repetition rate, so that the processing throughput has been low.

SUMMARY OF THE INVENTION

An object of the invention, accordingly, is to provide a laser processing apparatus, which can effect high quality and efficient welding of metals.

This object has been attained by a laser processing apparatus which comprises direct current power supply circuit means, main discharging circuit means connected to the power supply circuit means for supplying main discharging current, falling waveform control circuit means connected to the power supply circuit means for controlling the falling of a discharge current waveform, discharge current stopping circuit means connected to the waveform control circuit means for controlling this circuit means for stopping the discharge current when the discharge current becomes lower than a predetermined value, main control circuit means connected to the main discharge circuit means, falling waveform control circuit means and discharge current stopping circuit means for controlling these circuit means at predetermined timing, and laser beam oscillating means connected to the main discharge circuit means and falling waveform control circuit means for producing a laser beam according to the main discharge current and discharge current having a controlled falling waveform.

According to the invention, the pulse laser beam waveform includes a gently falling portion, and the pulse laser beam is turned off when the level of the falling portion becomes lower than a predetermined value. Thus, according to the invention, it is possible to obtain high quality and efficient welding of metals.

BRIEF DESCRIPTION OF THE DRAWINGS

By way of example, and to make the description clearer, reference is made to the accompanying drawings in which.

DETAILED DESCRIPTION OF THE PREFERRED EMBODIMENTS

Figure 2:
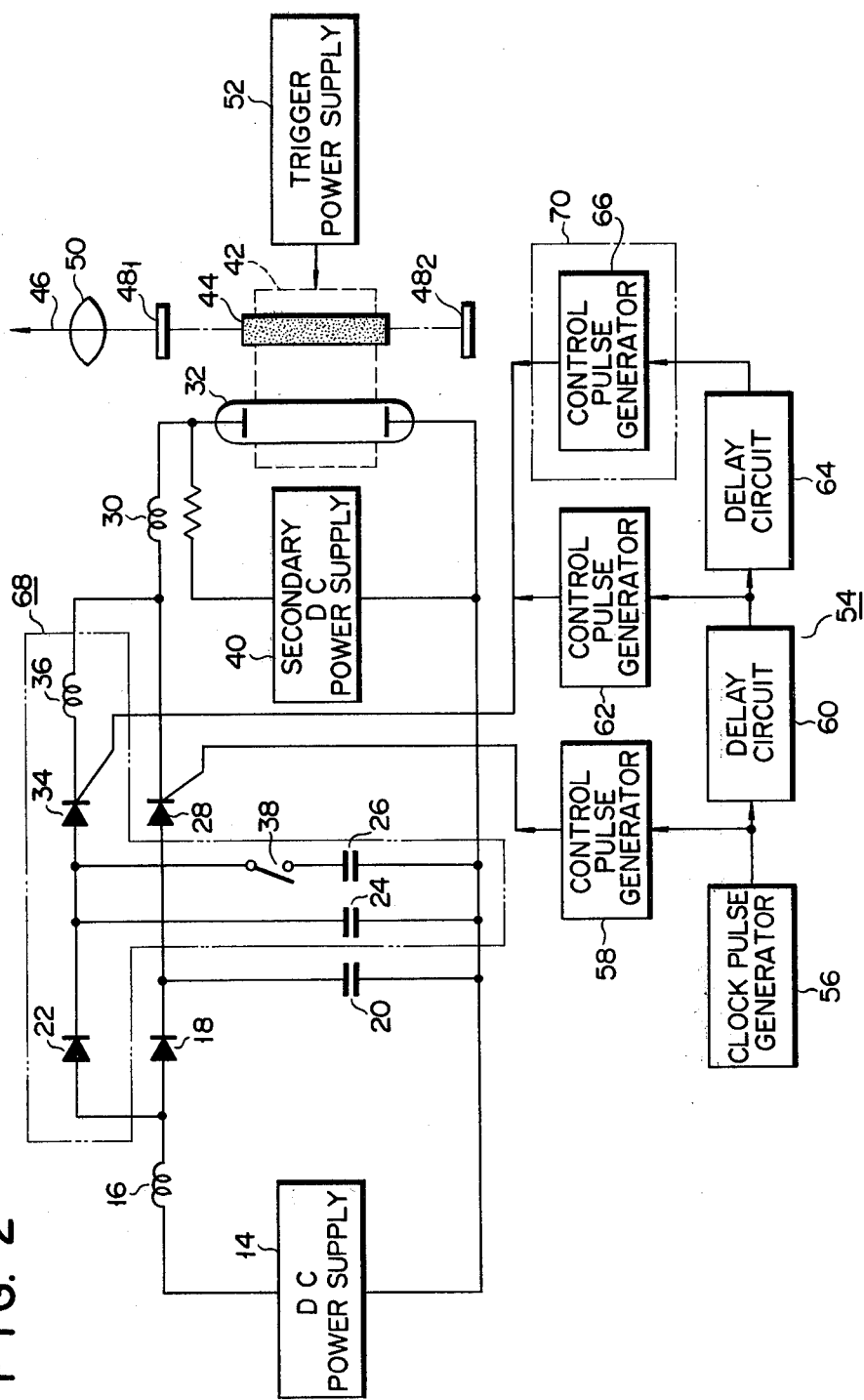
FIG. 2 is a schematic representation of a first embodiment of the laser processing apparatus according to the invention.

FIG. 2 schematically shows a first embodiment of the laser processing apparatus according to the invention. The output of a main DC power supply 14 is connected through a coil 16 and a reverse current blocking diode 18 to one end of a first capacitor 20. Current from the DC power supply 14 mentioned above is supplied to the first capacitor 20 for charging thereof. The output of the DC power supply 14 is further connected through the coil 16 and a reverse current blocking diode 22 to second and third capacitors 24 and 26. The current from the DC power supply 14 is further supplied to the second and third capacitors 24 and 26 for charging thereof.

The end of the first capacitor 20 is connected through a thyristor 28 and a waveform shaping coil 30 to a flash lamp 32. The charge in the capacitor 20 is discharged through the waveform shaping coil 30 to the flash lamp 32 when the thyristor 28 is turned on. The second and third capacitors 24 and 26 are connected at their one end through a gate turn-off thyristor (GTO) 34 and waveform shaping coils 36 and 30 to the flash lamp 32. The charge in the second and third capacitors 24 and 26 is discharged through the waveform shaping coils 36 and 30 to the flash lamp 32 when the GTO 34 is turned off. A switch 38 is provided on the charging and discharging path for the third capacitor 26, and the action of charging and discharging the third capacitor 26 takes place only when the switch 38 is "on".

An auxiliary DC power supply 40 is connected in series with a discharge stabilizing resistor 16 across the flash lamp 32. The flash lamp 32 is normally in a state of slight discharge caused by the current supplied from the auxiliary power supply 40.

The pulse light generated from the flash lamp 32 is condensed by a reflective cavity 42 to irradiate a laser rod 44 and thus cause optical pumping thereof. As a result, a pulse laser beam 46 is generated from the laser rod 44, and it is coupled through resonator mirrors $48_1$ and $48_2$ and a condensing lens 50 to the relevant workpiece portion for irradiation thereof. A trigger power supply 52 for starting the lamp 32 is connected to the condensing mirror 42.

A discharging control circuit generally designated at 54 controls the discharge operation of the flash lamp 32. This discharge control circuit 54 includes a clock pulse generator 56. The output side of the clock pulse generator 56 is connected to a first control pulse generator 58 and a first delay circuit 60. A clock pulse signal generated from the clock pulse generator 56 is supplied to the first control pulse generator 58 and first delay circuit 60. When a clock pulse as mentioned above is supplied to it, the first control pulse generator 58 generates a positive control pulse signal to turn on the thyristor 28.

The output side of the first delay circuit 60 is connected to a second control pulse generator 62 and a second delay circuit 64. The clock pulse signal mentioned above is supplied through the first delay circuit 60 to the second control pulse generator 62 and second delay circuit 64.

The output side of the second delay circuit 64 is connected to a third control pulse generator 66. The clock pulse signal mentioned above is coupled through the first and second delay circuits 60 and 64 to the third control pulse generator 66.

When the aforementioned clock pulse signal is supplied, the second and third control pulse generators 62 and 66 respectively generate positive and negative control pulse signals for turning on and turning off the GTO 34 respectively. The first delay circuit 60 is provided to set a time period from the instant of the start of discharge of the first capacitor 20 till the instant of the start of discharge of the second and third capacitors 24 and 26. The second delay circuit 64 is provided to set a time period from the start till the end of the discharge of the second and third capacitors 24 and 26. This time period is set to an interval from the start of discharge of the second and third capacitors 24 and 26 until the discharge current becomes lower than a predetermined value.

The reverse current blocking diode 22, second and third capacitors 24 and 26, gate turn-off thyristor 34 and waveform shaping coil 36 mentioned above form a falling waveform control circuit generally designated at 68. The third control pulse generator 66 constitutes a discharge current stopping circuit 70.

The operation of the apparatus having the construction as described above will now be described. In the first place, the switch 38 is opened, and in this state the first and second capacitors 20 and 24 are charged from the DC power supply 14. Then, the flash lamp 32 is started by applying a trigger voltage from the trigger power supply 52 to the reflective cavity 42, i.e., it is rendered into the normal slight discharge state as mentioned above.

Figure 3:
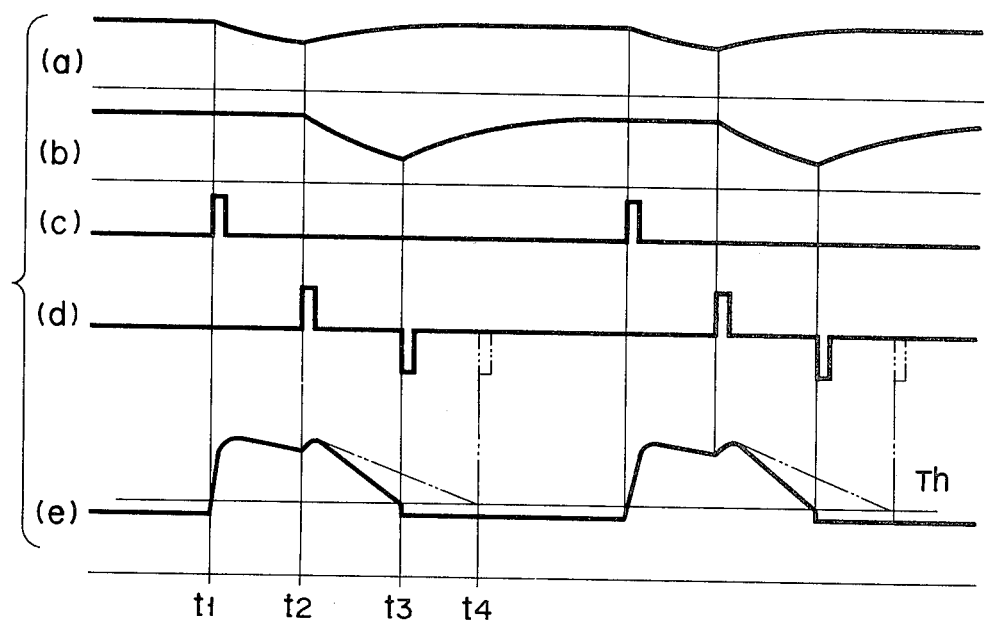
FIGS. 3(a) to 3(e) form a waveform chart for illustrating the operation of the first embodiment.
Figure 1:
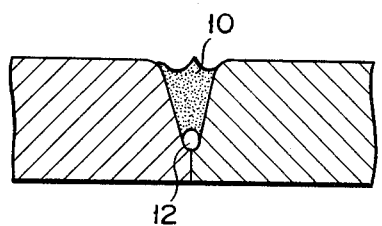
FIG. 1 is a schematic view showing a state of welding obtained with a prior art apparatus.

In this state, when a clock pulse is generated from the clock pulse generator 56 at an instant $t_1$ as shown in FIG. 3(c), the first control pulse generator 58 is actuated to turn on the thyristor 28. As a result, the charge in the first capacitor 20 is discharged to the flash lamp 32 as shown in FIG. 3(e), thus causing the pulse light generation of the flash lamp 32. When the second control pulse generator 62 is actuated to impress a positive control pulse upon the GTO 34 at an instant $t_2$ as shown in FIG. 3(d), the GTO 34 is turned on. As a result, the flash lamp 32 is discharged as shown in FIG. 3(e) to continue the pulse light generation. At this time a high voltage due to the second capacitor 24 is applied as commutating pulse to the cathode of the thyristor 28, thus turning off the thyristor 28 to stop the discharge of the first capacitor 20, whereupon the first capacitor 20 is turned to be charged again as shown in FIG. 3(a).

Subsequently, when the discharge current from the second capacitor 24 becomes lower than a value labeled Th in FIG. 3(e) at an instant $t_3$, a negative control pulse signal (FIG. 3(d)) is generated from the third control pulse generator 66 to turn off the GTO 34. As a result, the discharge of the second capacitor 24 is stopped. The discharge current from the second capacitor 24 from the instant $t_2$ till the instant $t_3$ decreases gently and linearly determined by the time constant of the discharge circuit which is comparatively large value, i.e., the inductance of the waveform shaping coils 36 and 30 is set to a comparatively high value. Thus, a light pulse having a gently falling portion is generated from the flash lamp 32. The second capacitor 24 is charged again immediately after the stop of the discharge as shown in FIG. 3(b).

The recharging of the second capacitor after the aforementioned sequence of operations for generating the first laser pulse is ended, a clock pulse is generated again from the clock pulse generator 56 as shown in FIG. 3(c), whereby the aforementioned sequence of operations is repeated to generate a second pulse. In the above way, successive pulses are generated each for every clock pulse generated.

When the switch 38 is closed, the discharge of the third capacitor 26 takes place at the time of the discharge of the second capacitor 24. Thus, the discharge current flowing into the flash lamp 32 changes more gently than the case when only the second capacitor 24 is discharged, as shown by the imaginary line in FIG. 3(e). Thus, the falling portion of the waveform of the pulse light generated from the flash lamp 32 is more gentle. In this case, the delay period of the second delay circuit 64 is switched to a period ($t_4-t_2$) from the instant of start of the discharge of the second and third capacitors 24 and 26 until the discharge current is reduced to a predetermined value Th.

Figure 5:
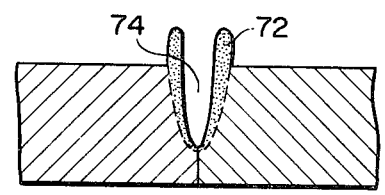
FIGS. 4 to 6 are schematic views showing states of welding obtained with the first embodiment of the laser processing apparatus.
Figure 4:
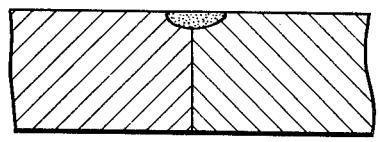
Figure 6:
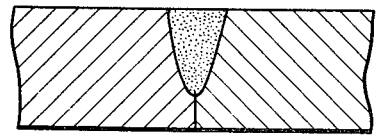

When the pulse light is generated from the flash lamp 32 in the above way, a pulse laser beam 46 which corresponds in waveform to the pulse light mentioned above, is generated by the laser rod 44 to effect the welding of the relevant workpiece part. With the rising portion of the pulse waveform, a superficial portion of the workpiece part is thermally fused as shown in FIG. 4. Then, with the high output portion of the waveform (near the instant $t_2$ in FIG. 3(e)), the fused metals are raised to form a recess in the workpiece set as shown in FIG. 5. Thereafter, with the falling portion of the pulse waveform the fused metal 72 is caused to gradually flow into the recess 74. Subsequently, the fused metal is cooled down after the end of the irradiation (i.e., after the instant $t_3$), whereby a weld which is free from internal air bubbles and has a falt surface can be obtained.

It is to be appreciated that with the first embodiment the waveform of the pulse laser beam 46 has a gently falling portion so that the raised fused metal 72 can be caused to gradually flow into the recess 74 to form the weld. Thus, with this embodiment such drawbacks as the generation of air bubbles within the weld or formation of local irregularities of the weld surface that might result in case when a rectangular pulse laser beam is used as in the prior art can be eliminated, and a high quality weld having a uniform sectional area and a flat surface can be obtained. Further, in the first embodiment the output is turned off when the falling portion of the pulse laser beam becomes lower than a predetermined value (at which the fused metal 72 is sufficiently stabilized). Thus, with the first embodiment, in contrast to the prior art method in which the discharge is continued until there is no charge in the capacitor, the action of charging and discharging can be repeatedly obtained at a high repetition rate, thus permitting the elevation of the processing efficiency. Further, since in the first embodiment two capacitors, namely the second and third capacitors 24 and 26, are provided as the capacitance for forming the falling portion of the pulse waveform such that the third capacitor 26 can be connected and disconnected by the switch 38, processing can be effected by using two different types of laser output waveforms depending upon the kind and characteristic of the workpiece metals.

Further, while in the above embodiment two capacitors are provided for the falling portion of the pulse waveform, it is also possible to provide three or more capacitors. By so doing, it is possible to set longer pulse widths of the pulse laser beam. Further, the last stage capacitpors, which are provided to form the falling portion, may consist of more than three capacitors. This permits an increased number of different slopes of the falling portion to be available for coping with an increased variety of welding processes. Further, the discharge control of the last stage capacitor or capacitors can be effected with a thyristor instead of the GTO. This can be readily obtained by merely providing a commutating capacitor for turning off the thyristor.

Figure 7:
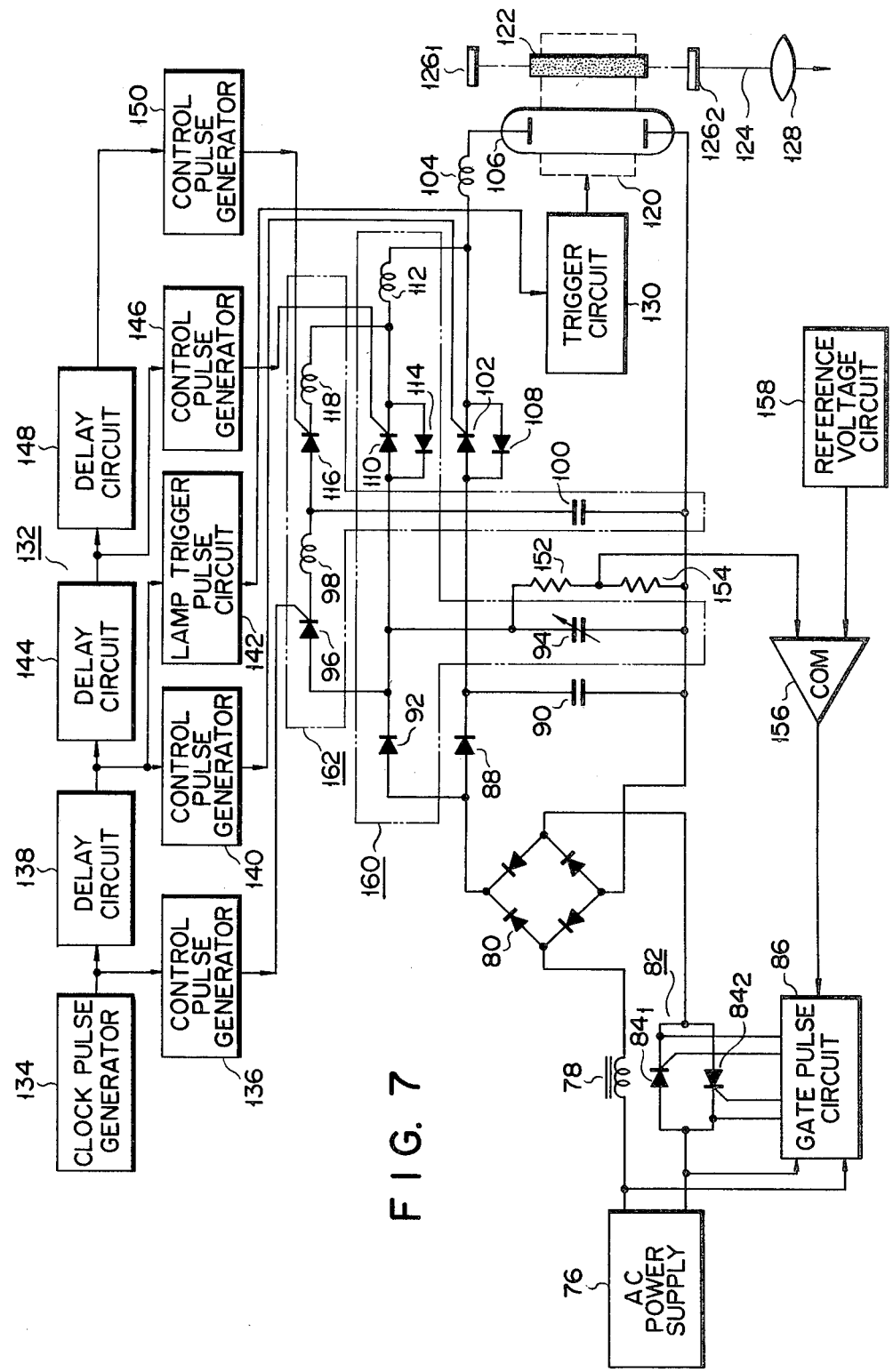
FIG. 7 is a schematic representation of a second embodiment of the laser processing apparatus.

FIG. 7 schematically shows a second embodiment of the laser processing apparatus according to the invention.

An AC power supply 76 is connected at one end thereof through a choke coil 78 to one of the input terminals of a rectifying circuit 80. The other output end of the AC power supply 76 is connected through a phase control rectifying circuit 82 to the other input terminal of the rectifying circuit 80. The phase control rectifying circuit 82 includes thyristors $84_1$ and $84_2$ connected in parallel and in opposite polarities. The phase control rectifying circuit 82 is connected to a gate pulse circuit 86, and the conduction angle of the thyristors $84_1$ and $84_2$ is controlled by gate signals provided from the pulse circuit 86.

The pulse output terminal of the rectifying circuit 80 is connected through a reverse current blocking diode 88 to one end of a first capacitor 90. The current from the rectifying circuit 80 is supplied to the first capacitor 90 for charging thereof. The pulse output terminal of the rectifying circuit 80 is also connected through a reverse current blocking diode 92 to one end of a second capacitor 94, and it is also connected through the reverse current blocking diode 92 and a thyristor 96 and a resonant charging inductor 98 to one end of a third capacitor 100. The current from the rectifying circuit 80 is supplied through the diode 92 and the thyristor 96 respectively to the second and third capacitors 94 and 100 for charging thereof. The third capacitor 100 is charged by resonant charging.

The first capacitor 90 is connected at one end through a thyristor 102 and waveform shaping coil 104 to a flash lamp 106. A diode 108 is connected in parallel with and in opposite polarity with respect to the thyristor 102. The charge in the first capacitor 90 is discharged through the waveform shaping coil 104 into the flash lamp 106 when the thyristor 102 is turned on.

The end of the second capacitor 94 is connected through a thyristor 110 and waveform shaping coils 112 and 104 to the flash lamp 106. A diode 114 is connected in parallel to and in opposite polarity with respect to the thyristor 110. The charge in the second capacitor 94 is discharged through the waveform shaping coils 112 and 104 to the flash lamp 106 when the thyristor 110 is turned on. One end of the third capacitor 100 is connected through a thyristor 116 and a waveform shaping coil 118 to the cathode of the thyristor 110. The charge in the third capacitor 100 is supplied as commutating pulse through the waveform shaping coil 118 to the thyristor 110. The thyristor 110 is turned off by this commutating pulse.

The pulse light generated from the flash lamp 106 is condensed by a reflective cavity 120 for irradiating a laser rod 122, thus causing optical pumping of the laser rod 122. The pulse laser beam 124 generated from the laser rod 122 is coupled through resonant mirrors $126_1$ and $126_2$ and condensing lens 128 to the relevant workpiece part (not shown) for irradiation thereof. A trigger circuit 130 for starting the flash lamp 106 is connected to the reflective cavity 120.

A discharge control circuit generally designated at 132 serves to control the discharge of the flash lamp 106. The discharge control circuit 132 includes a clock pulse generator 134. The output side of the clock pulse generator 134 is connected to a first control pulse generator 136 and a first delay circuit 138. The clock pulse signal generated from the clock pulse generator 134 is supplied to the first control pulse generator 136 and first delay circuit 138. When the aforementioned clock pulse signal is supplied, the first control pulse generator 136 generates a control pulse signal to turn on the thyristor 96.

The output side of the first delay circuit 138 is connected to a second control pulse generator 140, a lamp trigger pulse circuit 142 and a second delay circuit 144. The clock signal mentioned above is coupled through the first delay circuit 138 to the second control pulse generator 140, lamp trigger pulse circuit 142 and second delay circuit 144.

The second control pulse generator 140 and pulse circuit 142 generate respective control pulse signals when they receive the aforementioned clock pulse signal. The control pulse from the second control pulse generator 140 turns on the thyristor 102. The lamp trigger pulse circuit 142 drives the trigger circuit 130.

The output side of the second delay circuit 144 is connected to a control pulse generator 146 and a third delay circuit 148. The clock signal mentioned above is coupled through the first and second delay circuits 138 and 144 to a third control pulse generator 146 and to a third delay circuit 148. When the aforementioned clock pulse signal is supplied, the third control pulse generator 146 generates a control pulse signal to turn of the thyristor 110.

The third delay circuit 148 is connected to a fourth control pulse generator 150. The aforementioned clock signal is coupled through the first, second and third delay circuits 138, 144 and 148 to the fourth control pulse generator 150. When the aforementioned clock pulse signal is supplied, the fourth control pulse generator 150 generates a control pulse signal to turn on the thyristor 116.

The delay time of the first delay circuit 138 is set to a period from the instant of start of charging of the third capacitor 100 to the instant of start of discharging of the first capacitor 90. The delay period of the second delay circuit 144 is set to a period from the instant of start of discharging of the first capacitor 90 till the instant of start of discharging of the second capacitor 94. The delay time of the third delay circit 148 is set to a period until the discharge of the capacitor 94 is stopped after the charging thereof. This period is set to a period from the start of discharge of the second capacitor 94 till an instant when the discharge current becomes lower than a predetermined value.

The second capacitor 94 is a variable capacitor, across which series voltage detection resistors 152 and 154 are connected. The junction between the resistors 152 and 154 is connected to one input terminal of a comparing amplifier circuit 156. When the detected voltage with respect to the second capacitor 94 is reduced to a reference voltage of a reference voltage circuit 158, which is connected to the other input terminal of the comparing amplifier circuit 156, a control signal is sent out from the comparing amplifier circuit 156 to the gate pulse circuit 86. With this control signal, the gate pulse circuit 86 provides gate pulse signals to the thyristors $84_1$ and $84_2$ of the phase control rectifying circuit 82, thereby the voltage across the second capacitor 94 can be steadily maintained.

A falling waveform control circuit generally designated at 160 is constituted by the reverse current blocking diode 92, second capacitor 94, thyristor 110, diode 114 and waveform shaping coil 112 mentioned above. A discharge current stopping circuit generally designated at 162 is constituted by the charging control thyristor 96, resonant charging inductor 98, third capacitor 100, thyristor 116 and waveform shaping coil 118.

Figure 8:
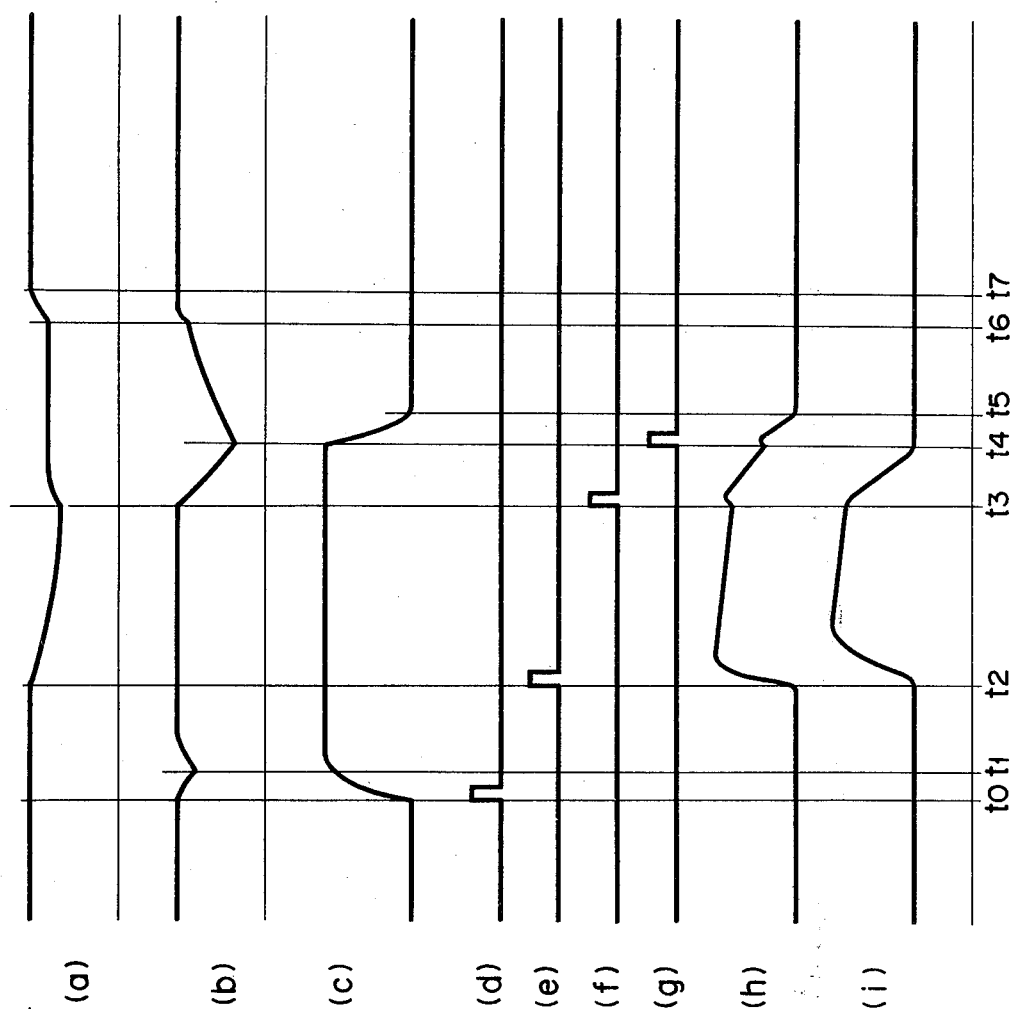
FIGS. 8(a) to 8(i) represent a waveform chart for illustrating the operation of the second embodiment.

The operation of the apparatus having the above construction will now be described. As shown in FIGS. 8(a) and 8(b), the first and second capacitors 90 and 94 have been charged up an in instant $t_0$.

When a clock pulse is generated from the clock pulse generator 134 in this state at an instant $t_0$ as shown in FIG. 8(d), the first control pulse generator 136 is actuated to turn on the thyristor 96. As a result, the charge in the second capacitor 94 is discharged as shown in FIG. 8(b), while the third capacitor 100 is charged by resonant charging as shown in FIG. 8(c). After the level of the voltage across the third capacitor 100 becomes higher than the level of the voltage across the second capacitor 94, the thyristor 96 is reversely biased at an instant $t_1$ and thus turned off, thus bringing an end to the charging of the third capacitor 100.

When the second control pulse generator 140 is actuated at an instant $t_2$, a control pulse is impressed upon the thyristor 102 as shown in FIG. 8(e). As a result, the thyristor 102 is turned on, whereby the charge in the first capacitor 90 is discharged into the flash lamp 106 as shown in FIG. 8(h). At the same time, the lamp trigger pulse circuit 142 is actuated, whereupon the trigger circuit 130 causes the discharge of the flash lamp 106. Thus, the flash lamp 106 commences the pulse light generation. With the pulse light generation of the flash lamp 106, the laser output rises with a delay time with respect to the lamp discharge current of FIG. 8(h), as shown in FIG. 8(i).

When the third control pulse generator 146 is actuated at an instant $t_3$, a control pulse as shown in FIG. 8(f) is impressed upon the thyristor 110. As a result, the thyristor 110 is turned on, whereby the charge in the second capacitor 94 is discharged into the flash lamp 106 as shown in FIG. 8(b), and the flash lamp 106 thus continues the pulse light generation. At this time, a high voltage due to the second capacitor 94 is impressed as commutating pulse upon the cathode of the thyristor 102, thus turning off the thyristor 102 to stop the discharge of the first capacitor 90. As a result, the first capacitor 90 is turned to be charged again as shown in FIG. 8(a). The second capacitor 94 has a capacitance which is set to be lower than the capacitance of the first capacitor 90 and is thus discharged with a smaller time constant. Thus, the slope of falling of the lamp discharge current during the period between the instants $t_3$ and $t_4$ is sharper than the slope of falling between the instants $t_2$ and $t_3$ as shown in FIG. 8(h).

When the fourth control pulse generator 146 is actuated at an instant $t_4$, a control pulse as shown in FIG. 8(g) is impressed upon the thyristor 116 to turn on the thyristor 116, whereby the charge in the third capacitor 100 is discharged into the flash lamp 106 as shown in FIG. 8(c). At this time, a high voltage due to the third capacitor 100 is impressed as commutating pulse upon the cathode of the thyristor 110 to turn off the thyristor 110. Thus the discharge of the second capacitor 94 is stopped, and the second capacitor 94 is turned to be charged again as shown in FIG. 8(b). Since the capacitance of the third capacitor 100 is set to be lower than the capacitance of the second capacitor 94, the slope of the falling of the lamp discharge current between the instants $t_4$ and $t_5$ is shaper than the slope of the falling portion between the instants $t_3$ and $t_4$ as shown in FIG. 8(h). The laser beam output as shown in FIG. 8(i) is stopped before the instant $t_4$, i.e., before the lamp discharge current reaches the zero level. At the instant $t_5$, the discharge of the third capacitor 100 is ended. This end of the discharge of the third capacitor 100 brings an end to the discharge waveform control cycle.

While the signal processing is made in the above way, after the instant $t_3$ the comparing amplifier circuit 156 is rendered operative since the voltage across the second capacitor 94 becomes lower than the aforementioned reference voltage. The gate pulse circuit 86 serves to increase the conduction angle of the thyristors $84_1$ and $84_2$ of the phase control rectifying circuit 82 according to the difference between the reference voltage and the detected voltage. The laser oscillation control gate signal cycle period (between instants $t_2$ and $t_4$) is several to 20 msec. On the other hand, the response time for the phase control is longer than 20 msec, as shown in FIGS. 8(a) and 8(b). Thus, the charging of the capacitors 94 and 90 is started from an instant $t_4$ and $t_6$ respectively after the completion of the discharge waveform control cycle, and the levels of the voltages across the capacitors 90 and 94 are restored to the levels at the instant $t_0$ when an instant $t_7$ is reached.

As has been shown, the first capacitor 90 having the greatest capacitance is discharged between the instants $t_2$ and $t_3$ to strongly excite the laser rod 122 for sufficiently fusing the relevant workpiece part with the laser light. Then, during the period between the instants $t_3$ and $t_4$, the second capacitor 94 having the second greatest capacitance is discharged to cause gradual solidification of the fused portion from the edge thereof. At the instant $t_4$, the discharge of the third capacitor 100 having the least capacitance is caused to impress the commutating voltage upon the thyristor 110, thus stopping the discharge of the second capacitor 94. This has an effect of preventing extra heat from flowing into the weld after the solidification thereof. Since the welding is effected in the above way, with the second embodiment it is possible to reduce the defects of the weld and thermally affected layer. Also, in the second embodiment the waveform control of the lamp discharge current is effected such that the discharge is stopped while there are remaining voltages across the large capacity capacitors 90 and 94 while completing the discharge of the smallest capacity capacitor 100 so that the recharging can be effected in a short period of time. Thus, with this embodiment it is possible to maintain a high pulse discharge repetition rate to permit improvement of the welding speed. With the second embodiment, it is also possible to control the falling slope of the laser output by varying the time constant of discharging into the flash lamp 106 through the control of the capacitance of the second capacitor 94. Thus, the falling slope can be set to an optimum value depending upon the structure of the workpiece, thermal characteristic thereof, etc.

While in the above second embodiment three capacitors have been provided for the control of the laser output waveform, it is also possible to provide more than three capacitors to the same end. Further, when the second embodiment is applied to a laser processing apparatus having an improved rising characteristic, further improvement of the welding characteristic can be obtained. Further, while in the second embodiment, the third capacitor 100 was charged through the thyristor 96 connected to the diode 92, it is also possible that the capacitor 100 may be charged by connecting the anode of the thyristor 96 to the cathode of the diode 88. It is also possible to provide a switch which connects the anode of the thyristor 96 to the cathode of the diode 88 or 92 to pass a charging current depending on the situations.

The above first and second embodiments are given for the purpose of illustration only and by no means limitative, and various changes and modifications can be made without departing from the scope of the invention.

What is claimed is:

1. A laser processing apparatus comprising:
   direct current power supply circuit means;
   main discharge circuit means connected to said direct current power supply circuit means for supplying main discharge current thereto;
   falling waveform control circuit means connected to said direct current power supply circuit means for controlling the falling of the discharge current waveform;
   discharge current stopping circuit means connected to said waveform control circuit means for effecting the control thereof so that the discharge current is stopped when the discharge current becomes lower than a predetermined value;
   main control circuit means connected to said main discharge circuit means, falling waveform control circuit means and discharge current stopping circuit means for effecting the control of these individual circuit means at predetermined timings; and
   laser beam oscillating means connected to said main discharge circuit means and falling waveform control circuit means for providing a laser beam according to the main discharge current and discharge current having a controlled falling waveform portion.

2. A laser processing apparatus according to claim 1, wherein said falling waveform control circuit means includes:
   a diode having the anode thereof connected to the plus side of said direct current power supply circuit means;
   one or more capacitors having one end connected to the cathode of said diode, said capacitors being charged by said direct current power supply circuit means through said diode, said capacitors but one being each provided with a switch for varying the falling portion of the discharge current waveform and being closed when desired;
   a thyristor having the gate terminal thereof connected to said main control circuit means for on-off controlling the discharge current from the aforesaid but-one and other capacitors; and
   an inductor connected to the cathode of said thyristor shaping the waveform of the discharge current flowing through said thyristor.

3. A laser processing apparatus according to claim 1, wherein said discharge current stopping circuit means includes a control pulse generating circuit connected to said main control circuit means and operated on the basis of a clock pulse signal applied from said main control circuit means at a predetermined timing for stopping the discharge current flowing through said waveform control circuit means.

4. A laser processing apparatus according to claim 3, wherein said discharge current stopping circuit means includes:
   a thyristor having the anode connected to the cathode of one of said diodes to pass the charging current from said direct current power supply circuit means, for on-off controlling the charging current on the basis of a control signal supplied from said main control circuit means to its gate at a predetermined timing;
   an inductor connected to said thyristor for being charged by resonant charging;
   a capacitor having one end connected to said inductor and forming a resonant circuit with said inductor being charged by resonant charging by the current through said thyristor;
   a thyristor having the anode connected to said capacitor for on-off controlling the discharge current on the basis of a control signal supplied from said main control circuit means at a predetermined timing; and
   an inductor connected to the cathode of said thyristor for shaping the waveform of the discharge current flowing through said thyristor to supply commutating current to one of said thyristors connected in oppositely conductive relation to said diodes that is turned on at the last so as to turn off said last-turned-on thyristor.

5. A laser processing apparatus according to claim 1, wherein said main control circuit means includes:
   a clock pulse generating circuit;
   a first control pulse generating circuit connected to said clock pulse generating circuit for supplying a control signal for causing said main discharge circuit means to effect main discharge on the basis of the clock pulse signal from said clock pulse generating circuit;
   a first delay circuit connected to said clock pulse generating circuit for delaying the clock pulses thereof for a predetermined period of time;
   a second control pulse generating circuit connected to said first delay circuit for supplying a control signal for causing said falling waveform control circuit means to effect discharge on the basis of the clock pulse signal supplied from said first delay circuit; and a second delay circuit connected to said first delay circuit for supplying the clock pulse supplied from said first delay circuit to said discharge current stopping circuit means after delaying it for a predetermined period of time.

6. A laser processing apparatus according to claim 1, wherein said falling waveform control circuit means includes:

one or more diodes having the anode connected to the plus side of said direct current power supply circuit means;

one or more capacitors having one end connected to the cathode of said diodes, said capacitors being charged from said direct current power supply circuit means through said diodes;

one or more thyristors having the gate terminal connected to said main control circuit means for on-off controlling the discharge current from said but-one and other capacitors, a diode being connected in parallel with and in oppositely conductive form with respect to each of said thyristors; and an inductor commonly connected to the cathode of said thyristors for shaping the waveform of the discharge current supplied to said laser beam oscillating means.

7. A laser processing apparatus according to claim 6, wherein said first capacitor is a variable capacitor capable of variation of its capacitance if desired.

8. A laser processing apparatus according to claim 1, wherein said main control circuit means includes:

a clock pulse generating circuit;

a first control pulse generating circuit connected to said clock pulse generating circuit for supplying a control signal to said discharge current stopping circuit means on the basis of the clock pulse signal from said pulse generating circuit to effect charging by resonant charging;

a first delay circuit connected to said clock pulse generating circuit for delaying said clock pulse signal for a predetermined period of time;

a second control pulse generating circuit connected to said first delay circuit for supplying a control signal for main discharging to said main discharge circuit means on the basis of the clock pulse signal from said first delay circuit;

a lamp trigger pulse circuit connected to said first delay circuit for supplying a control signal for causing the discharge of an exciting lamp of said laser beam oscillating means in synchronism to the start of the main discharge of said main discharge circuit means to said main laser beam oscillating means;

one or more delay circuits connected in series with said first delay circuit, said delay circuits serving to delay the clock pulse signal input for respective predetermined periods of time;

one or more control pulse generating circuits connected to the output side of said respective delay circuits, said control pulse generating circuits serving to turn on the thyristors of said falling waveform control circuit means in a predetermined order on the basis of clock pulse output of said one or more delay circuits;

a delay circuit connected to the last one of said one or more delay circuits for delaying the clock pulse input for a predetermined period of time; and a control pulse generating circuit connected to said last-mentioned delay circuit for supplying a control signal to said discharge current stopping circuit means on the basis of a clock pulse supplied from said delay circuit to stop the discharge current from said falling waveform control circuit means.

* * * * *